Aug. 6, 1963

A. P. FRAAS ETAL 3,100,188

REACTOR MODERATOR STRUCTURE

Filed May 19, 1961

INVENTOR.
Arthur P. Fraas
BY   John J. Tudor

ATTORNEY

INVENTOR.
Arthur P. Fraas
John J. Tudor
ATTORNEY

Aug. 6, 1963    A. P. FRAAS ETAL    3,100,188
REACTOR MODERATOR STRUCTURE
Filed May 19, 1961    3 Sheets-Sheet 3

INVENTOR.
Arthur P. Fraas
BY   John J. Tudor

ATTORNEY

3,100,188
REACTOR MODERATOR STRUCTURE
Arthur P. Fraas, Knoxville, and John J. Tudor, Oak Ridge, Tenn., assignors to the United States of America as represented by the United States Atomic Energy Commission
Filed May 19, 1961, Ser. No. 111,416
2 Claims. (Cl. 204—193.2)

The present invention relates generally to the neutronic reactor art, and more particularly to means for maintaining the alignment of moderator blocks in such reactors.

The cores of many heterogeneous reactors comprise a multiplicity of moderator blocks stacked in a multiplicity of layers in such a manner so as to form a structure of vertically-stacked parallel columns of blocks. Each block is provided with one or more channels passing longitudinally therethrough for the acceptance of fuel elements, control rods, experimental apparatus, and for the conduction of a coolant in heat exchange relationship with the fuel elements. The blocks are stacked so that these channels are aligned with respect to each other, thus providing continuous vertical passageways through the core.

During reactor operation dimensional changes occur within these moderator blocks causing misalignment of the above-mentioned passageways. First, thermal expansion occurs, and since the coefficient of thermal expansion of the moderator usually differs from the coefficient of expansion of the surrounding structural material, the core becomes misaligned with respect to the surrounding structure. Secondly, as is well known, materials change dimensionally when subjected to neutron irradiation. Since the neutron flux within a reactor core varies in magnitude from one location to another, the dimensional changes of blocks in the portion of a reactor core in which the neutron flux is highest is greater than the dimensional changes in the blocks located in the areas of less neutron activity. Thus, misalignment of the above-mentioned channels results.

Misalignment of a control rod channel may, in severe cases, cause the control rod to bind, thereby creating the possibility of a severe accident caused by loss of control over the reactor. In the same manner, a fuel element could become lodged within the reactor core causing great inconvenience and expense in the extraction of the element. Moreover, misalignment of coolant channels causes reduction in the cross-sectional area of the coolant flow path, thereby reducing coolant flow and causing either an increase in fuel element temperature or an increase in pumping requirements, either of which is undesirable. Thus, it can be seen that misalignment of a moderator structure is attended by extremely undesirable consequences.

In the co-pending application of common assignee, Serial No. 111,414, filed May 19, 1961, in the name of Bill L. Greenstreet, for "Reactor Moderator Structure," a series of metallic restraining grids disposed between layers of moderator blocks are described which provide a solution to the misalignment problems. However, restraining grids of the type described in that application operate in tension and can be formed only from materals which have a high strength in tension. Unfortunately, most economical materials which can be used are rather highly absorptive of neutrons and do not function well at very high temperatures. Certain refractory or ceramic materials such as beryllium oxide, magnesium oxide, silicon carbide, and aluminum oxide are not highly absorptive of neutrons and are capable of operation at very high temperatures. These materials are, however, extremely weak in tension and cannot be used in the restraining grids described in the application referred to above.

It is, therefore, the general object of the present invention to provide a restraining grid which can be fabricated from ceramic materials.

A further object of the invention is to provide a restraining grid in which only compressive loading of the grid members occurs.

A still further object of the invention is to provide a restraining grid formed from beryllium oxide.

Other objects of the invention will become apparent from an examination of the following description of the invention and the appended drawings, wherein.

In accordance with the present invention the above objects are attained in a moderator block structure by chamfering or cutting away a portion of the horizontal edges of the moderator blocks so that between each layer of blocks a grid-like system of intersecting channels of any convenient cross-sectional shape is formed. These channels are filled with abutting lengths of a ceramic material which are keyed to each block at at least one point along each upper horizontal edge of each block. Around the periphery of the block structure means are provided to compressively load the refractory grid system thus formed in the intersecting channels.

Of the ceramic materials mentioned above, beryllium oxide is preferred because of its moderating properties, low cross section, and its coefficient of thermal expansion which is near the coefficient of thermal expansion of steel. Thus, the differential expansion between a steel supporting structure and a beryllium oxide grid is minimized.

Although the moderator blocks may be keyed to the ceramic grid in any convenient manner, it is preferred that it be accomplished by providing a system of recesses in the blocks into which fit lugs provided on the grid. This preferred structure will be illustrated below in connection with the description of one embodiment of the invention.

Figure 1:
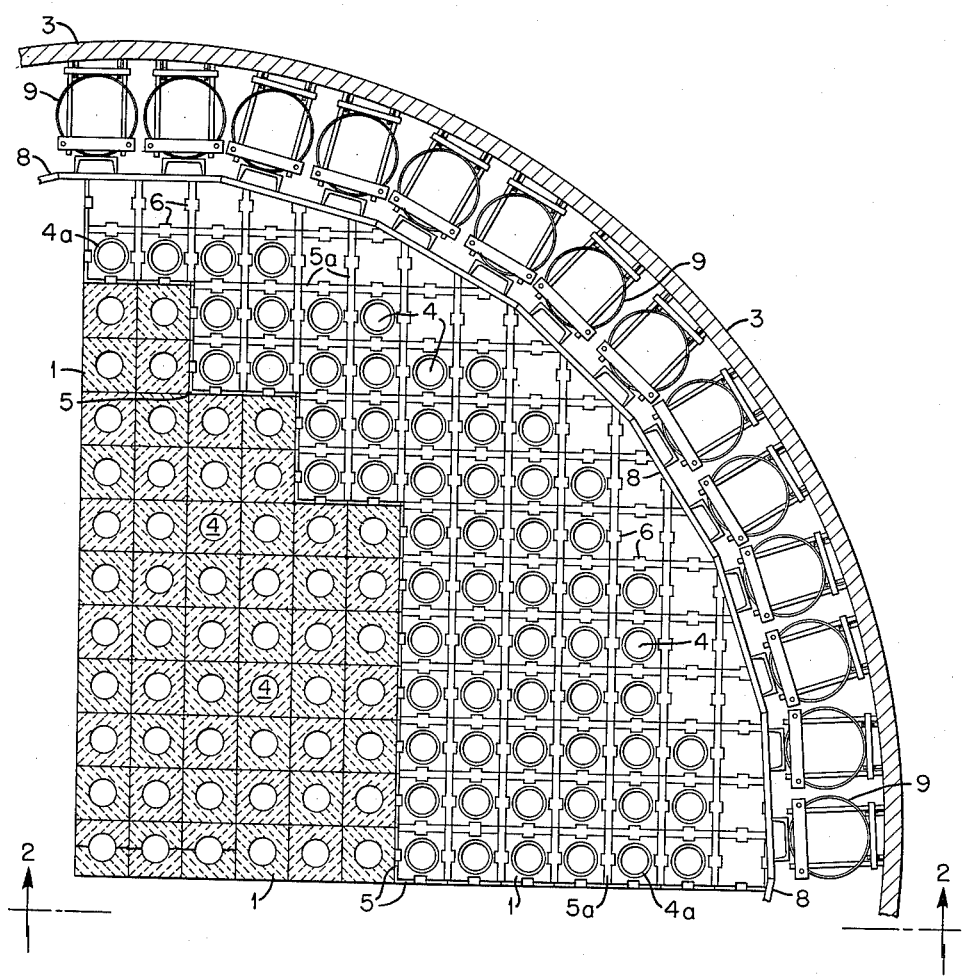
FIG. 1 is a partial plan view of a reactor to which the present invention has been applied.
Figure 2:
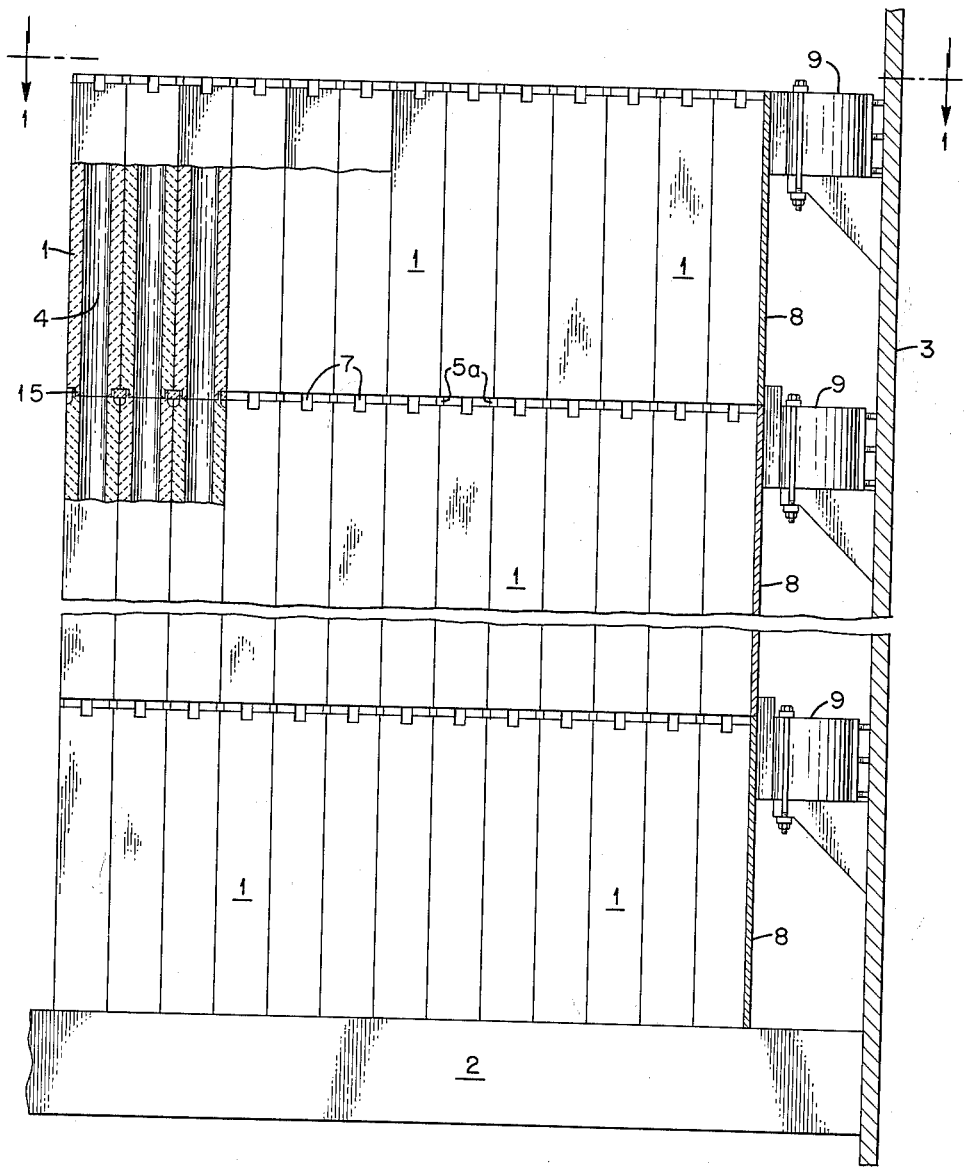
FIG. 2 is a partial elevation view in section of that reactor.

To illustrate the invention in greater detail, reference is made to FIGS. 1 and 2, which are partial horizontal and vertical sectional views, respectively, of a reactor structure to which the present invention has been applied. Although only slightly more than one quadrant of a right cylindrical core is shown in these views, it is to be understood that unless specifically described otherwise the quadrants not illustrated are identical to the portion shown. In FIGS. 1 and 2 a multiplicity of moderator blocks 1, formed from graphite for example, are stacked in several layers upon a steel supporting grid 2 located within a steel pressure shell 3. Each block is provided with a vertically-oriented channel 4, and the blocks are aligned so as to provide a multiplicity of continuous channels penetrating the structure vertically. The blocks are keyed together vertically by pilots 15 which extend from the bottom of each block and fit into an enlargement 4a in channel 4 at the top of the block immediately below it in the structure.

Figure 3:
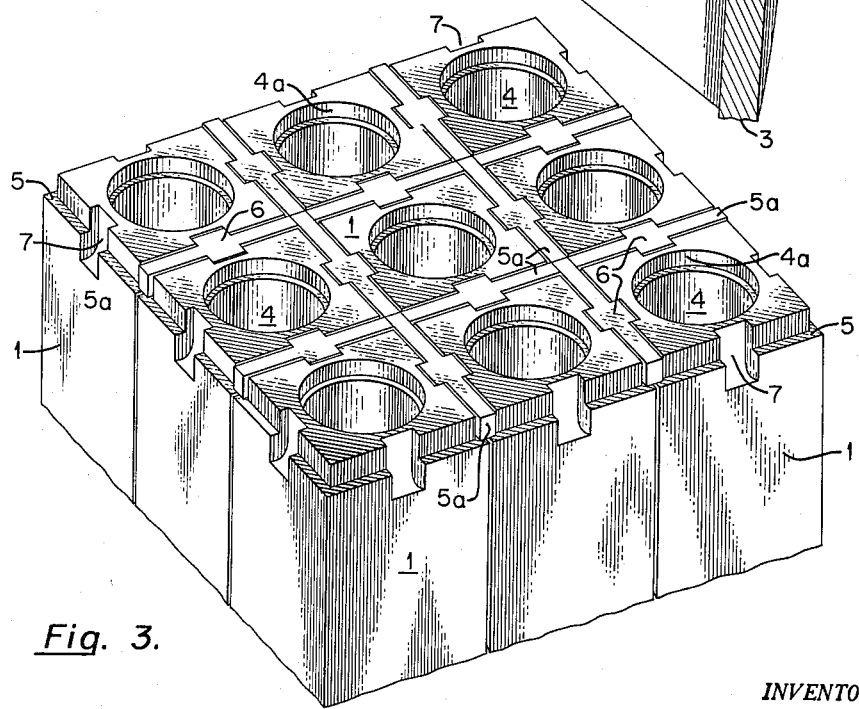
FIG. 3 is an isometric view showing one layer of moderator blocks and its associated surroundings from the reactor structure of FIGS. 1 and 2.

Now referring conjunctively to FIGS. 1, 2 and 3, the top edges of each block in the structure are chamfered or cut away so as to form a grid-like system of intersecting channels 5, in which are located abutting short lengths of a ceramic material 5a such as beryllium oxide. The grid system thus formed is keyed into each block by means of lugs 6 which fit into recesses 7. As illustrated in the drawings, the length of the ceramic grid sections is approximately equal to the width of the moderator blocks 1. It should be noted at this point, however, as will be obvious hereinafter, that any convenient length section may be used so long as a continuous keyed grid is provided, since the grid is always maintained in compression and is never subject to a tensile load.

The grid system associated with each course of moderator blocks terminates at the periphery of the moderator structure where terminal sections of the grid abut against a multiplicity of steel plates 8, which plates serve in a dual capacity as a thermal barrier for the reactor core and compression plates for the grid system. Located in the space between plates 8 and the pressure vessel wall 3 are a multiplicity of adjustable tubular springs 9, two of which are provided for each plate of each course or layer of moderator blocks 1. These springs are located at the levels of each of the grid systems and are adjusted so as to transmit, through plates 8, a compressive load to the grids.

Figure 4:
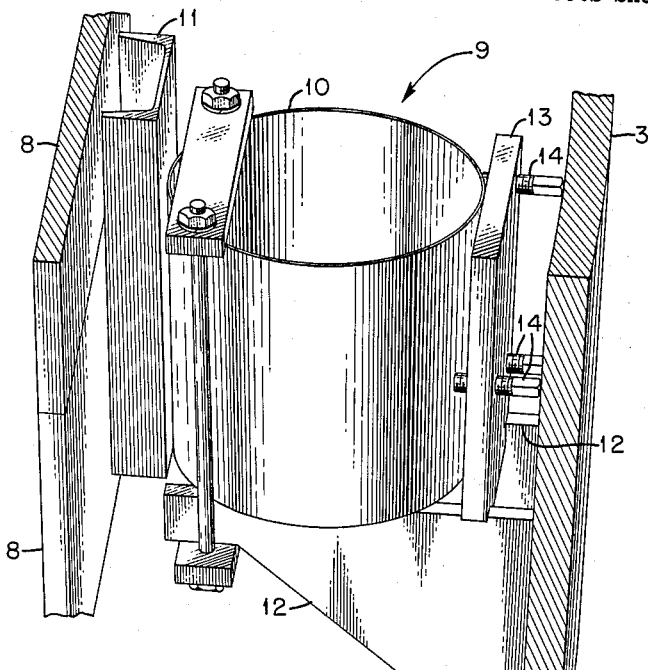
FIG. 4 is a detailed isometric view of a single tubular spring 9, from the reactor structure of FIGS. 1 and 2.

Referring now to FIG. 4, which is a more detailed view of one tubular spring, steel tubular spring member 10 bears against channel member 11, the latter member being secured by welding to steel compression plate 8, and is supported from beneath by guiding plates 12, which are secured by welding to pressure vessel wall 3. A jack plate 13 which is adjustably spaced away from pressure vessel wall 3 by means of set screws 14 and which is supported from beneath by guiding plates 12, bears on tubular spring member 10 so that the spring may be compressed and a compressive load transmitted to the grid system.

The above-described tubular springs are highly advantageous for use in the invention in several respects. First, the springs being located in the peripheral space around the reactor and being separated from the reactor core by bearing plates 8 can be maintained at a uniform temperature by circulating a portion of the reactor coolant over them. The tubular configuration of the springs lends itself to such cooling. Therefore, a substantially uniform compressive stress can be maintained in the grid at all times. Secondly, as is shown in FIG. 1, preferably the springs are closely spaced so that their deformation under stress is limited by adjacent springs. This arrangement adds greatly to the rigidity and strength of the spring system, thereby enhancing the ability of the structure to withstand violent lateral forces occasioned by earthquakes, explosions and the like.

Since many deviations from the illustrative embodiment described above may be made without departing from the spirit and scope of the present invention, the description should be interpreted as being merely illustrative and not in a limiting sense. Rather, the invention should be limited only by the following claims.

Having described the invention, what is claimed is:

1. In a neutronic reactor comprising a pressure vessel and a moderator structure disposed therein, an improved moderator structure comprising a multiplicity of moderator blocks arranged in horizontal layers to form a multiplicity of vertically stacked columns of blocks, all of said blocks in each vertical column of blocks being keyed together, a plurality of ceramic grids being disposed between said horizontal layers of moderator blocks, said ceramic grids providing horizontal restraint to said moderator blocks; a multiplicity of pressure plates covering the lateral surface of said moderator structure in abutting relationship with the peripheral terminal lengths of said ceramic grids, tubular springs disposed between said pressure vessel and said pressure plates, said springs having their axes of revolution vertically disposed to facilitate passage of coolant gas through said springs, said springs being spaced apart by a selected distance such that at a preselected point of spring deflection the sides of said springs will contact adjacent springs, thereby causing a large increase in resistance to further deflection of said springs, and means for adjusting the individual spring tension.

2. In a neutronic reactor comprising a pressure vessel and a moderator structure disposed therein, an improved moderator structure comprising a multiplicity of moderator blocks arranged in horizontal layers to form a multiplicity of vertically stacked columns of blocks, all of said blocks in each vertical column of blocks being keyed together and the upper horizontal edges of all of said blocks in said structure being chamferred and provided with at least one recess on each edge; a multiplicity of short lengths of ceramic material arranged in end-abutting relationship within the grid-like systems of channels formed by the assembly of said chamferred blocks, each of said lengths of ceramic material in the grids thus formed which is adjacent to one of said recesses being provided with a lug fitting into said adjacent recess; a multiplicity of pressure plates covering a lateral surface of said moderator structure in abutting relationship with the peripheral terminal length of said ceramic grids, tubular springs being disposed between said pressure vessel and said pressure plates, said springs having their axes of revolution vertically disposed to facilitate passage of coolant gas through said springs, said springs being spaced apart by a selected distance such that at some preselected point of spring deflection the sides of said springs will contact adjacent springs, thereby causing a large increase in the resistance to further deflection, and respective jack plates disposed between the pressure vessel and each spring to adjustably set the spring tension.

References Cited in the file of this patent

UNITED STATES PATENTS

| 2,872,398 | Ashley et al. | Feb. 3, 1959 |
| 2,998,364 | Stubbs et al. | Aug. 29, 1961 |

FOREIGN PATENTS

| 1,195,789 | France | May 19, 1959 |
| 1,209,950 | France | Sept. 28, 1959 |
| 1,211,573 | France | Oct. 12, 1959 |